(12) United States Patent
Delchambre et al.

(10) Patent No.: US 10,533,405 B2
(45) Date of Patent: Jan. 14, 2020

(54) SEISMIC WAVE GENERATING TOOL, SUCH AS A SPARK GAP OF AN ELECTRIC ARC GENERATION DEVICE

(71) Applicant: ENE29 S.àr.L., Luxembourg (LU)

(72) Inventors: Michael Delchambre, Toulouse (FR); Jesus Minakata Esparza, Calgary (CA)

(73) Assignee: ENE29 S.À.R.L., Luxembourg (LU)

( * ) Notice: Subject to any disclaimer, the term of this patent is extended or adjusted under 35 U.S.C. 154(b) by 225 days.

(21) Appl. No.: 15/736,128

(22) PCT Filed: Jun. 10, 2016

(86) PCT No.: PCT/EP2016/063337
§ 371 (c)(1),
(2) Date: Dec. 13, 2017

(87) PCT Pub. No.: WO2016/202698
PCT Pub. Date: Dec. 22, 2016

(65) Prior Publication Data
US 2018/0179876 A1    Jun. 28, 2018

(30) Foreign Application Priority Data
Jun. 17, 2015  (FR) ..................... 15 55544

(51) Int. Cl.
*E21B 43/25* (2006.01)
*E21B 43/00* (2006.01)
*E21B 28/00* (2006.01)
*G01V 1/157* (2006.01)

(52) U.S. Cl.
CPC .............. *E21B 43/25* (2013.01); *E21B 28/00* (2013.01); *E21B 43/003* (2013.01); *G01V 1/157* (2013.01)

(58) Field of Classification Search
CPC ........ E21B 43/25; E21B 28/00; E21B 43/003; G01V 1/157; G01V 2210/1299; G01V 1/40
USPC .......................................... 367/147
See application file for complete search history.

(56) References Cited

U.S. PATENT DOCUMENTS

| | | |
|---|---|---|
| 3,180,418 A | 4/1965 | MacLeod |
| 4,074,758 A | 2/1978 | Scott |
| 4,164,978 A | 8/1979 | Scott |
| 4,169,503 A | 10/1979 | Scott |

(Continued)

OTHER PUBLICATIONS

Hunting Energy Services, "Mechanical Centralizers and Decentralizers," 2014, 1 page.

*Primary Examiner* — Michael R Wills, III
(74) *Attorney, Agent, or Firm* — Seed Intellectual Property Law Group LLP

(57) ABSTRACT

A seismic wave generating tool, such as a spark gap, of an electric arc generation device includes an upper part and a lower part defining a discharge chamber between them, at least one retaining arm connecting the upper part to the lower part, first and second electrodes respectively associated with the upper and lower parts and arranged in the discharge chamber. The retaining arm comprises an electrically insulating part facing the electrodes. The tool includes a first deployable device implementing a current return and connecting the upper part to the lower part. The first deployable device is configured to be in a retracted state and in a deployed state in which it is at a distance from the discharge chamber.

14 Claims, 1 Drawing Sheet

(56) References Cited

U.S. PATENT DOCUMENTS

Figure 1:
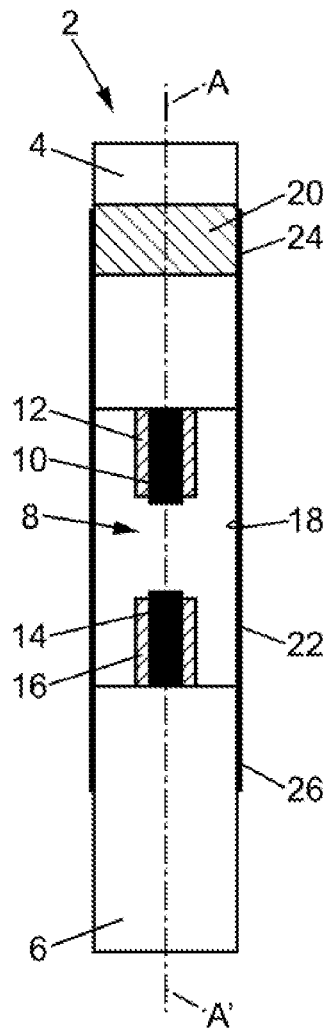

| | | | |
|---|---|---|---|
| 4,345,650 A | | 8/1982 | Wesley |
| 5,301,169 A | * | 4/1994 | Baria ................... G01V 1/157 181/106 |
| 5,305,287 A | * | 4/1994 | Ballard, Jr. ............. G01V 1/52 181/113 |
| 5,948,171 A | * | 9/1999 | Grothaus ................ B08B 3/12 134/1 |
| 6,227,293 B1 | | 5/2001 | Huffman et al. |
| 6,427,774 B2 | | 8/2002 | Thomas et al. |
| 7,267,654 B2 | * | 9/2007 | Matula ............ A61B 17/22004 367/141 |
| 8,220,537 B2 | * | 7/2012 | Leon ...................... E21B 43/26 166/177.5 |
| 8,613,312 B2 | | 12/2013 | Zolezzi-Garreton |
| 9,567,839 B2 | * | 2/2017 | Rey-Bethbeder ....... E21B 36/04 |
| 9,647,427 B2 | | 5/2017 | Delchambre et al. |
| 9,732,601 B2 | | 8/2017 | Delchambre et al. |
| 9,748,740 B2 | | 8/2017 | Delchambre et al. |
| 2011/0139441 A1 | * | 6/2011 | Zolezzi Garreton ........................ E21B 43/003 166/249 |
| 2014/0060844 A1 | | 3/2014 | Barbour et al. |

\* cited by examiner

SEISMIC WAVE GENERATING TOOL, SUCH AS A SPARK GAP OF AN ELECTRIC ARC GENERATION DEVICE

The present invention relates to a tool for generating seismic waves, such as a spark gap of an electric arc generation device.

Such a device is intended to be placed in a deep well (for example several kilometers deep). The generation of an electric arc is then used for example to create a seismic wave in order to stimulate hydrocarbon production.

There are several existing methods for stimulating hydrocarbon (or "Enhanced Oil Recovery"). One of the methods used most consists of generating a pulsed electrical discharge in a liquid such as hydrocarbon. This electrical discharge causes a strong shock wave, which propagates in a natural hydrocarbon reservoir.

U.S. Pat. No. 4,345,650 discloses a spark gap and a method for the electrohydraulic recovery of crude oil. To achieve this, an electric spark is generated between two electrodes, creating an explosion at or near a subsurface oil-bearing formation. This explosion generates shock waves and hydraulic waves which propagate in the subsurface oil-bearing formation and cause forcible migration of a hydrocarbon mixture toward adjacent wells called collection wells.

FIGS. 5A to 5D of U.S. Pat. No. 4,345,650 show an embodiment of the spark gap proposed by that document. The spark gap comprises two electrodes, a capacitor bank, and a firing circuit, among other elements. The spark gap is connected to a winch truck with a cable that allows controlling various parameters of the spark gap and also allows providing electric power to the capacitor bank. In order to obtain a high power explosion, the capacitor bank is placed closer to the electrodes to avoid any electrical losses. A spark is produced between the two electrodes when the electrical energy stored in the capacitor bank is applied across the electrodes by means of the firing circuit, which causes an electric arc at the electrodes.

U.S. Pat. No. 6,227,293 discloses a similar device that can also be used in a borehole to stimulate oil production. The disclosed device comprises at least one pulsed power source positioned in a well. The power source has an electrohydraulic generator and an electromagnetic generator.

Figure 2:
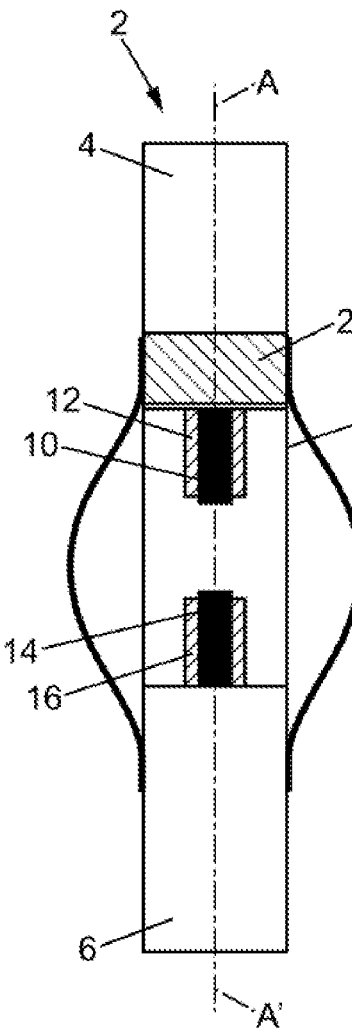

The embodiment shown in FIG. 2 of U.S. Pat. No. 6,227,293 illustrates a spark gap with two electrodes arranged in a well filled with a fluid, known as drilling mud, which allows optimal propagation of waves generated by an electric arc between the electrodes. Each electrode is carried by an electrode holder, and metal arms connect the two electrode holders. These metal arms extend parallel to the electrodes at a predetermined distance therefrom.

In an alternative embodiment, U.S. Pat. No. 6,227,293 discloses the use of a membrane to contain the medium in which the discharge between the electrodes occurs. Thus, the medium always presents the same characteristics, which enables reproducible firing.

In such a structure, it is necessary to prevent a parasitic electrical discharge (internal arc) from occurring between an electrode and a metal arm. This would be uncontrolled discharge and could cause premature wear or breakage of the spark gap.

To reduce the risk of an internal arc, document WO2015040555 discloses a spark gap of an electric arc generation device for creating a seismic wave, with a first electrode associated with a first electrode mounting, a second electrode associated with a second electrode mounting and having a concave surface facing the first electrode as well as a diameter that is substantially larger than the diameter of the first electrode, and at least one connection arm connecting the first electrode mounting to the second electrode mounting.

Document WO2015040556 proposes another technical solution for reducing the risk of an internal arc. It discloses a spark gap comprising a first body supporting a first electrode mounting associated with a first electrode having a first electrode end, a second body supporting a second electrode mounting associated with a second electrode arranged facing the first electrode end, and a connection arm connecting the first body to the second body. The first body and the second body have a generally cylindrical outer shape and are aligned along a common longitudinal axis. The first electrode end is offset from the longitudinal axis toward the side opposite the connection arm. The invention also relates to an electric arc generation device comprising such a spark gap.

To enable their use in the maximum number of wells, the diameter of spark gaps is constantly decreasing (from 140 mm to less than 80 mm), which results in a decrease in the distance between the electrodes and arms. There is thus a significant potential risk of an electric arc being created between an electrode and an arm, which has the effect of reducing the performance of the spark gap as well as its service life. For example, the devices of the prior art can fire 3000 to 4000 times before spark gap maintenance, meaning a change of electrodes and sometimes a complete replacement of the spark gap.

The aim of the present invention is therefore to provide a tool for generating a seismic wave, such as a spark gap, wherein the electrodes are arranged in a discharge chamber between retaining arms but for which the risk of an internal arc occurring between an electrode and a retaining arm is substantially reduced in comparison to devices of the prior art.

Advantageously, the present invention enables miniaturization of a seismic wave generation tool in comparison to known spark gaps of the prior art and/or those with a longer service life. The seismic wave generating tool according to the present invention can thus be fired tens of thousands of times for example before its maintenance.

To this end, the invention proposes a seismic wave generating tool, such as a spark gap of an electric arc generation device, comprising:
  an upper part and a lower part which define a discharge chamber between them,
  at least one retaining arm connecting the upper part to the lower part,
  a first electrode associated with the upper part and a second electrode associated with the lower part, both arranged in the discharge chamber,
  characterized in that it comprises a first deployable device connecting the upper part to the lower part, and
  in that the retaining arm comprises an electrically insulating part facing the electrodes, and
  in that a current return is implemented by the first deployable device, the deployable device able to be in a retracted state and in an deployed state in which it is at a distance from the electrodes.

Thus, when the first deployable device is retracted, the footprint of the tool is relatively small, which facilitates moving it around in wells. When the first deployable device is extended, it is moved away from the electrodes, which reduces the risk of an internal arc occurring between an electrode and an arm.

A first embodiment provides that the first deployable device comprises a first ring that is movable relative to the upper part, and at least one flexible arm with a first end connected to the first movable ring and a second end connected to the lower part of the tool.

To facilitate deformation of the flexible arm, the arm has for example a tongue shape. It is thus possible to deform each flexible arm with relatively little mechanical force.

Alternatively, each flexible arm is outside the discharge chamber when the deployable device is in its deployed state.

In one embodiment, it is provided that the first movable ring surrounds the upper part of the tool and is adapted to move along a longitudinal axis of said upper part. Thus, the flexible arms are deformed and moved away from the electrodes, which reduces the risk of internal arcs.

The first movable ring may be associated with gear means, to improve the accuracy of its displacement.

Alternatively, the first movable ring has an internal thread and the upper part of the tool has an external thread. The movement of the ring is then helical, which twists the flexible arms. This twisting allows obtaining greater stiffness of the flexible arms when the first movable ring is in the low position.

To improve the service life of such a device, the flexible arm (or each flexible arm) has for example a metal frame. It is thus possible to deform the flexible arm a large number of times without damaging it.

To reduce the risk of internal arcs between the flexible arm and the electrodes, the arm advantageously comprises an electrically insulating part facing the electrodes.

When the diameter of the well is relatively large, a variant embodiment is provided in which a second deployable device connects the upper part to the lower part, the second deployable device being able to be in a retracted state and in a deployed state in which it is at a distance from the discharge chamber. This second deployable device can be used in particular to center the tool in the well.

Alternatively, the first deployable device comprises a first ring that is movable relative to the upper part, and at least one flexible arm with a first end connected to the first movable ring and a second end connected to the lower part of the tool (as described above for example); the second deployable device comprises at least one deformable arm and a second movable ring which is arranged around the upper part of the tool on the side opposite the lower part, the deformable arm having a first end connected to the second movable ring and a second end connected to the lower part of the tool. It is thus possible to deform each deformable arm using the second movable ring, in order to center the tool in the well.

To enhance the performance of such a tool and in particular to improve its service life, the deformable arm comprises for example a metal frame.

To prevent current return in the walls of the well, the deformable arm is advantageously of an electrically non-conductive material. For mechanical reasons, it is conceivable however to have a deformable arm made at least partially of an electrically conductive material.

To improve the protection of the deformable arm from any risk of internal arcs, the arm comprises for example an electrically insulating part facing the electrodes.

Figure 3:
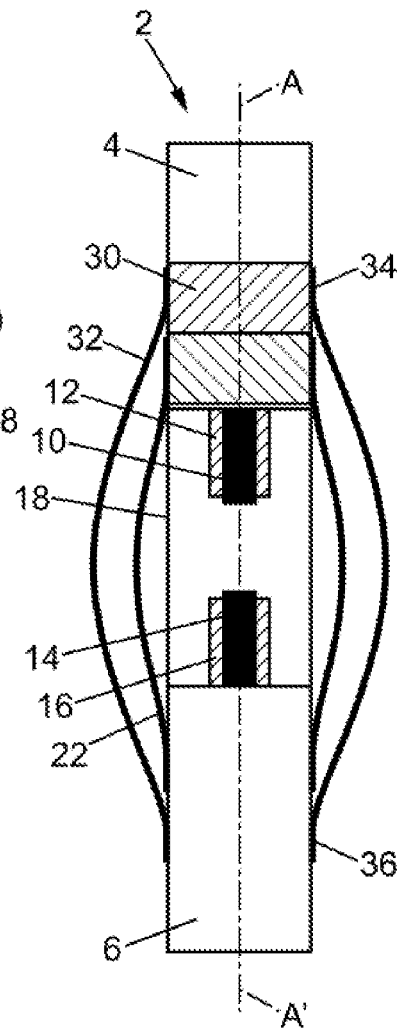

Details and advantages of the invention will be apparent from the following description, with reference to the accompanying drawings in which:

FIG. 1 is a principle view in longitudinal section of a stimulation tool of the invention, FIG. 2 is a principle view in longitudinal section of the stimulation tool of FIG. 1, representing a deployable device in another position, and FIG. 3 is a principle view in longitudinal section according to another embodiment of the stimulation tool.

FIG. 1 schematically represents a stimulation tool 2 such as a spark gap, comprising an upper part 4, a lower part 6, defining a discharge chamber 8 between them, a first electrode 10 associated with a first mounting 12, a second electrode 14 associated with a second mounting 16, and two retaining arms 18 arranged between the upper part 4 and the lower part 6 of the tool 2.

It is assumed in the following description that the upper part 4 and lower part 6 are aligned vertically, and that the upper part 4 is located above the lower part 6.

The upper part 4 and lower part 6 preferably have the general shape of a circular cylinder. They are coaxially arranged and have the same diameter. The upper part 4 and lower part 6 are of a material that must be both resistant to high pressures and high temperatures but also must be electrically conductive. Thus, for example, the upper part 4 and lower part 6 are made of steel.

The spacing between the upper part 4 and lower part 6 defines the discharge chamber 8. Said chamber also has a circular cylindrical shape of the same diameter as the upper part 4 and lower part 6. Its height corresponds to the distance separating the upper part 4 and lower part 6.

The upper part 4 is adapted, among other things, to support the first electrode 10 by means of the first mounting 12. The first mounting 12 is for example of tubular shape having a first end attached to the upper part 4 and a second end adapted to hold the first electrode 10 in the discharge chamber 8. For example, the first mounting 12 is composed of an electrically insulating material such as a ceramic or thermoplastic material for example.

The first electrode 10 is a type of electrode known to those skilled in the art. For example, it is an electrode in the shape of a circular cylindrical rod, possibly provided with a point at its free end. Other types of electrodes compatible with the application can of course be used.

An electronic power supply device typically comprising an electrical storage unit such as a series of capacitors for example and a switch is used to supply electric power to the first electrode 10. This electronic power supply device is used to apply a very high electric potential within a very short time to the first electrode 10, while passing a high intensity current through it.

The lower part 6 supports the second electrode 14 by means of the second mounting 16. The second mounting 16 has for example a tubular cylindrical shape and is composed of an electrically conductive material. The second electrode 14 is thus at the same potential as the lower part 6 of the tool 2.

The second electrode 14 is also known to those skilled in the art. To ensure an optimum electric arc between the first electrode 10 and the second electrode 14, the latter preferably has a diameter at least equal to that of the first electrode 10. The second electrode 14 is coupled to an electrical ground which may be that of the electronic power supply device.

In a preferred embodiment, the first electrode 10 and second electrode 14 each preferably have an axis of symmetry, and the two axes of symmetry are preferably coincident as an axis hereinafter called the longitudinal axis A-A', also corresponding to the axis of the upper part 4 and lower part 6, as illustrated in FIG. 1. The first electrode 10 is thus aligned with the second electrode 14. More generally, one will note that the tool 2 is substantially symmetrical about the longitudinal axis A-A'.

As represented in FIG. 1, the upper part 4 is mechanically connected to the lower part 6 by two retaining arms 18. However, there could be for example one, three, four or any other number of retaining arms 18. The retaining arms 18 are positioned at the periphery of the discharge chamber 8. The retaining arms 18 preferably have the shape of a square profile. Alternatively, the retaining arms 18 may have a rod shape. Preferably, the retaining arms 18 are of an electrically non-conductive material such as a synthetic and/or composite material for example. The use of such a material makes it possible to obtain good electrical insulation between the electrodes 10 and 14 and the retaining arm 18, and to obtain good structural strength of the lower part 6 relative to the upper part 4. It is important to maintain a constant distance between the first electrode 10 and second electrode 14, despite the repeated impacts generated by electric arcs in the discharge chamber 8.

In another variant, the retaining arms 18 have for example a metal frame serving a structural role, and a portion of synthetic material. The synthetic material may cover the metal frame of the retaining arm 18 only partially (on the side where the electrodes are) or preferably fully.

For current return between the upper part 4 and the lower part 6, a first deployable device is provided which connects the upper part 4 to the lower part 6, the deployable device able to be in a retracted state and in a deployed state in which it is at a distance from the electrodes 10, 14. Thus, the second electrode 14 is connected to ground via the second mounting 16, the lower part 6, and the expandable device.

The expandable device comprises a first ring 20 that is movable from a high position to a low position, and at least one flexible arm 22.

The movable ring 20 has an annular shape adapted to the shape of the outer surface of the upper part 4. It is mounted at the periphery of the upper part 4 in a manner that enables it to move upwards (or parallel to the longitudinal axis A-A') around the upper part 4 between what is called the low position and what is called the high position.

The embodiment represented in FIG. 1 provides two flexible arms 22. However, there could for example be one, three, four, or any other number of flexible arms 22.

A flexible arm 22 has a first end 24 which is connected to the first movable ring 20 and a second end 26 which is connected to the lower part 6 of the tool 2.

In a preferred embodiment, the second end 26 of the flexible arm 22 is welded to the bottom part 6. Other attachment systems may also be used.

The flexible arms 22 have for example a tongue shape and are composed of a material or of multiple materials adapted to withstand the explosions generated by the electric arcs in the discharge chamber 8. In an advantageous embodiment, each flexible arm 22 is composed of an electrically insulating composite material and/or synthetic material and an electrically conductive frame. The electrically conductive frame may be of metal or metal alloy and is preferably arranged on an outer face of the flexible arm 22, meaning on the face of the flexible arms 22 opposite the discharge chamber 8. Thus, with such an arrangement, the electrical continuity between the upper part 4 and the lower part 6 is achieved by a connection external to the discharge chamber 8, which reduces the likelihood of an internal arc appearing between the flexible arms 22 (and more specifically their metal frame) and the first electrode 10 in comparison to devices of the prior art. Another structure, possibly with a metal frame facing towards the electrodes, could be envisaged. Indeed, the flexible arms 22 should already prevent any internal arc, solely by their distance from the electrodes during generation of the electric arcs.

To reduce the likelihood of an electric arc being created between the flexible arm 22 and the first electrode 10 and thus improve the service life of the tool 2, the flexible arms 22 are adapted to deform so that they are outside the discharge chamber 8 when the first movable ring 20 is in its low position.

To deform the flexible arms 22 towards the exterior of the discharge chamber 8, the first movable ring 20 moves from the high position (FIG. 1) to the low position (FIG. 2).

In a preferred embodiment, the first movable ring 20 slides along the longitudinal axis A-A' around the upper part 4 in order to transition from its high position (FIG. 1) to its low position (FIG. 2). Movement of the first movable ring 20 may be achieved for example by means of an actuator and/or a gear system (these are not represented in the figures).

Alternatively, the movement of the movable ring 20 along the longitudinal axis A-A' may be inspired by the technical solution proposed by patent application FR 2,999,221 A1. As proposed in that document, the movable ring 20 is locked in rotation and has an internal thread (not visible in the figures) adapted to engage with an external thread of a part movable in rotation and fixed in translation. The part that is movable in rotation (not visible in the figures) surrounds the upper part 4 to allow movement of the movable ring 20 in translation along the longitudinal axis A-A' when the part that is movable in rotation turns on the upper part 4.

Preferably, the first movable ring 20 is of an electrically conductive material, such as steel for example.

When the first movable ring 20 is in the high position (FIG. 1), the flexible arms 22 are not deformed and extend longitudinally at the periphery of the discharge chamber 8. In this position, the flexible arms 22 are located just at the periphery of the discharge chamber 8 as shown in FIG. 1.

When the first movable ring 20 is in its low position as shown in FIG. 2, the flexible arms 22 are deformed outside the discharge chamber 8, and are at a distance from the electrodes 10, 14, which reduces the risk of internal arcs between one of the electrodes 10, 14 and a flexible arm 22. In this position, the first movable ring 20 is near the discharge chamber 8.

Due to the deformation of the flexible arms 22, such a tool 2 can be fired tens of thousands of times (firing corresponds to generation of an electric arc between the electrodes 10 and 14) before its maintenance, while devices of the prior art can only be fired thousands of times.

In this position (low position), the footprint of the tool 2 is larger due to the deformation of the flexible arms 22 (FIG. 2), which also centers the spark gap 2 in the well in which it is located. Indeed, once the flexible arms 22 are deformed, they come into contact with the oil well pipe. Moreover, such a positioning at the center of the well allows better distribution of the explosion and significantly improves the results of the tool 2 in comparison to devices of the prior art.

Alternatively, to improve the repeatability of the explosions of the tool 2, a stop (not represented in the figures) is positioned at the end of the upper part 4, close to the discharge chamber 8. Thus, when the first movable ring 20 reaches the low position, it will remain positioned around the upper part 4 and cannot come further towards the retaining arm 18.

The first movable ring 20 may have an internal thread. In this case, the upper part 4 has a complementary external thread. Moving the first movable ring 20 from its high position to its low position will then be a helical movement around the upper part 4, causing a twisting of the flexible arms 22.

FIG. 3 shows another alternative embodiment. In this alternative, the characteristics of the upper part 4, the lower part 6, the discharge chamber 8, and the electrodes 10 and 14 are similar to those presented in the previous paragraphs. Similarly, the first movable ring 20 and the flexible arms 22 also have the same characteristics, both structurally and functionally.

In this embodiment, a second movable ring 30 and at least one deformable arm 32 are used. The second movable ring 30 is arranged around the upper part 4 of the tool 2, above the first movable ring 20. The shape and material of the second movable ring 30 are for example (but not necessarily) identical to those of the first movable ring 20. Thus, as with the first movable ring 20, the second movable ring 30 has an annular shape adapted to the shape of the outer surface of the upper part 4 and is mounted at the periphery of the upper part 4 so as to be able to move upwards (or parallel to the longitudinal axis A-A') around the upper part 4.

Preferably, the second movable ring 30 is independent of the first movable ring 20. Thus, deployment of the flexible arms 22 and deployment of the deformable arms 32 occur independently, thereby controlling the deformation of the deformable arms 32 according to the diameter of the well.

The deformable arms 32 connect the second movable ring 30 to the lower part 6. The deformable arms 32 have a length greater than the length of the flexible arms 22. Thus, when the deformable arms 32 are deformed they are further away from the discharge chamber 8 than the flexible arms 22 (first movable ring 20 in the low position).

The deformable arms 32 are, in a preferred embodiment, composed exclusively of an insulating material such as a composite material for example and do not have an electrically conductive frame. However, it is conceivable for mechanical reasons to have, for example, a metal frame covered with a non-conductive material.

Preferably, the deformable arms 32 are parallel to the axis A-A' and are arranged at the periphery, close to the discharge chamber 8. For example, the deformable arms 32 have a tongue shape.

Each deformable arm 32 has a first end 34 attached to the second movable ring 30 and a second end 36 attached to the lower part 6. Preferably, screw means are used to implement these attachments. Other means of attachment may be used, of course.

Preferably, the second movable ring 30 is adapted to move from a raised position to a lowered position. Only the lowered position of the second movable ring 30 is shown in FIG. 3.

The first movable ring 20 and the second movable ring 30 respectively move from the high position to the low position and from the raised position to the lowered position simultaneously. Thus, for example, when the first movable ring 20 is in the high position then the second movable ring 30 is in the raised position. The same is true for the other positions.

Advantageously, when the first movable ring 20 and the second movable ring 30 are respectively in the high and raised position, then the tool 2 has a smaller footprint than the devices of the prior art.

When the first movable ring 20 is in the low position and the second movable ring 30 is in the lowered position, then the footprint of the tool 2 is increased, which allows centering the tool 2 in wells of relatively large diameters.

With such a device, in order to reduce the risk of current return in the walls of the well during an electrical discharge, it is proposed to have deformable arms that are non-conductive or at least have a face intended to come into contact with the well formed of an insulating material, which improves safety for the work site and for personnel working on the surface. However, one will note that this is not mandatory, because normally the outer surface (and therefore the movable rings) of the upper part 4 and lower part 6 are grounded.

In an alternative embodiment, the flexible arms 22 and deformable arms 32 are staggered around the discharge chamber 8.

The embodiments of the invention allow dissociating the mechanical connection from the electrical connection between the parts of a spark gap. With the invention, it is therefore possible to prevent the appearance of an internal arc between the electrodes and each arm for a spark gap that is compact in size. In addition, it is now possible to center the tool in wells of variable diameter. The tool is thus compatible with a large number of wells while ensuring both highly effective explosions and preventing the occurrence of internal arcs, which improves its service life in comparison to spark gaps of the prior art. For example, with such a device, tens of thousands of electric arcs can be created before maintenance of the tool.

The invention thus provides means for reducing the risk of electric arc leakage. It also allows miniaturizing a spark gap in order to be able to access wells of variable diameter which can be as low as 50 mm.

The present invention is not limited to the embodiments described above by way of non-limiting examples and represented in the drawing, nor to the mentioned variants, but concerns any embodiment within the reach of the skilled person in the scope of the following claims.

The invention claimed is:

1. A seismic wave generating tool of an electric arc generation device, comprising:
    an upper part and a lower part which define a discharge chamber between them,
    at least one retaining arm connecting the upper part to the lower part,
    a first electrode associated with the upper part and a second electrode associated with the lower part, both arranged in the discharge chamber, and
    a first deployable device connecting the upper part to the lower part, wherein:
    the retaining arm comprises an electrically insulating part facing the electrodes, and
    a current return is implemented by the first deployable device, the first deployable device being configured to be in a retracted state and in a deployed state in which the first deployable device is at a distance from the electrodes.

2. The seismic wave generating tool according to claim 1, wherein the first deployable device comprises a ring that is movable relative to the upper part, and at least one flexible arm with a first end connected to the ring and a second end connected to the lower part of the tool.

3. The seismic wave generating tool according to claim 2, wherein the flexible arm has a tongue shape.

4. The seismic wave generating tool according to claim 2, wherein the flexible arm is outside the discharge chamber when the deployable device is in the deployed state.

5. The seismic wave generating tool according to claim 2, wherein the surrounds the upper part of the tool and is configured to move along a longitudinal axis of said upper part.

6. The seismic wave generating tool according to claim 2, wherein the first movable ring is associated with gear means for moving the ring.

7. The seismic wave generating tool according to claim 2, wherein the ring has an internal thread and the upper part has an external thread.

8. The seismic wave generating tool according to claim 2, wherein the flexible arm has a metal frame.

9. The seismic wave generating tool according to claim 8, wherein the flexible arm comprises an electrically insulating part facing the electrodes.

10. The seismic wave generating tool according to claim 1, further comprising a second deployable device that connects the upper part to the lower part, the second deployable device being configured to be in a retracted state and in a deployed state in which second deployable device is at a distance from the discharge chamber.

11. The seismic wave generating tool according to claim 10, wherein the first deployable device comprises a first movable ring that is movable relative to the upper part, and at least one flexible arm with a first end connected to the first movable ring and a second end connected to the lower part of the tool, and wherein the second deployable device comprises at least one deformable arm and a second movable ring which is arranged around the upper part of the tool on a side of the first movable ring opposite to the lower part, the deformable arm having a first end connected to the second movable ring and a second end connected to the lower part of the tool.

12. The seismic wave generating tool according to claim 11, wherein the deformable arm comprises a metal frame.

13. The seismic wave generating tool according to claim 12, wherein the deformable arm comprises an electrically insulating part facing the electrodes.

14. The seismic wave generating tool according to claim 11, wherein the deformable arm is of an electrically non-conductive material.

* * * * *

UNITED STATES PATENT AND TRADEMARK OFFICE
CERTIFICATE OF CORRECTION

PATENT NO. : 10,533,405 B2  
APPLICATION NO. : 15/736128  
DATED : January 14, 2020  
INVENTOR(S) : Michael Delchambre et al.

Page 1 of 1

It is certified that error appears in the above-identified patent and that said Letters Patent is hereby corrected as shown below:

On the Title Page

Item (73) Assignee:
"ENE29 S.À.R.L., Luxembourg (LU)" should read --ENE29 S.ÀR.L., Luxembourg (LU)--.

In the Claims

Column 9, Claim 6, Line 6:
"wherein the first movable ring is associated with gear means" should read --wherein the ring is associated with gear means--.

Signed and Sealed this
Twenty-fifth Day of August, 2020

Andrei Iancu
*Director of the United States Patent and Trademark Office*